United States Patent
Biswas et al.

(10) Patent No.: US 11,194,568 B1
(45) Date of Patent: Dec. 7, 2021

(54) CONFIGURATION RETENTION SERVICE FOR WEB APPLICATION SERVERS

(71) Applicant: SAP SE, Walldorf (DE)

(72) Inventors: Devashish Biswas, Haridwar (IN); Nikita Jain, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/081,699

(22) Filed: Oct. 27, 2020

(51) Int. Cl.
| | |
|---|---|
| *G06F 8/65* | (2018.01) |
| *G06F 8/71* | (2018.01) |
| *G06F 16/951* | (2019.01) |
| *G06F 16/955* | (2019.01) |
| *G06F 16/958* | (2019.01) |
| *G06F 8/61* | (2018.01) |

(52) U.S. Cl.
CPC ............... *G06F 8/65* (2013.01); *G06F 8/61* (2013.01); *G06F 8/71* (2013.01); *G06F 16/951* (2019.01); *G06F 16/955* (2019.01); *G06F 16/958* (2019.01)

(58) Field of Classification Search
CPC ..... G06F 8/60; G06F 8/61; G06F 8/65; G06F 8/71; G06F 16/951; G06F 16/955; G06F 16/958
See application file for complete search history.

(56) References Cited

U.S. PATENT DOCUMENTS

| | | | | |
|---|---|---|---|---|
| 8,176,321 | B1* | 5/2012 | Perry | H04L 67/2819 713/167 |
| 8,607,223 | B2* | 12/2013 | Fors | G06F 8/64 717/174 |
| 8,839,233 | B2* | 9/2014 | Kaegi | H04L 67/10 717/176 |
| 9,336,027 | B2* | 5/2016 | Kemmler | G06F 9/45525 |
| 10,579,966 | B1* | 3/2020 | Willson | G06F 8/30 |
| 2004/0143835 | A1* | 7/2004 | Dattke | G06F 9/44526 719/315 |
| 2011/0296377 | A1* | 12/2011 | Morozov | G06F 8/30 717/113 |
| 2013/0138718 | A1* | 5/2013 | Mallur | H04L 41/0803 709/203 |

* cited by examiner

*Primary Examiner* — Marina Lee
(74) *Attorney, Agent, or Firm* — Klarquist Sparkman, LLP

(57) ABSTRACT

Technologies are described for retaining configuration information for software applications during upgrades. For example, when an addon software package is deployed to a web application server running a main software platform, the configuration information for the addon software package can be preserved separately (e.g., independent of the common configuration file) and used later to restore the addon configuration information if needed. In some implementations, an addon presence file is used to store an entry for the addon software package. The entry identifies another file containing the configuration information for the addon software package. If the main software platform is upgraded resulting in the common configuration file being overwritten or replaced, then the addon configuration information can be added back to the common configuration file using the preserved configuration information.

20 Claims, 5 Drawing Sheets

CONFIGURATION RETENTION SERVICE FOR WEB APPLICATION SERVERS

BACKGROUND

Software platforms are used by organizations to provide a variety of computing services. For example, a software platform can provide business intelligence services to client devices (e.g., as a web service). Software platforms, and associated software programs, need to store configuration information. In some situations, the stored configuration information is overwritten during a software upgrade, such as when the software platform is upgraded. This can result in service disruptions (e.g., the associated software programs may not operate until the configuration information is restored).

In some solutions, the configuration information is manually restored after a software platform is upgraded. For example, configuration files can be manually edited by an administrator. This manual procedure may need to be performed for each instance of the software platform (e.g., the software platform may be installed on a number of servers).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for retaining configuration information for software applications during upgrades. For example, when an addon software package is deployed to a web application server running a main software platform, the configuration information for the addon software package can be preserved separately (e.g., independent of the common configuration file) and used later to restore the addon configuration information if needed. In some implementations, an addon presence file is used to store an entry for the addon software package. The entry identifies another file containing the configuration information for the addon software package. When the main software platform is upgraded, the addon presence file can be checked for the entry of the addon software package. When the entry for the addon software package is detected, the configuration information for the addon software package can be added back to the common configuration file using the preserved configuration information (e.g., from an addon configuration file).

DETAILED DESCRIPTION

Overview

Figure 1:
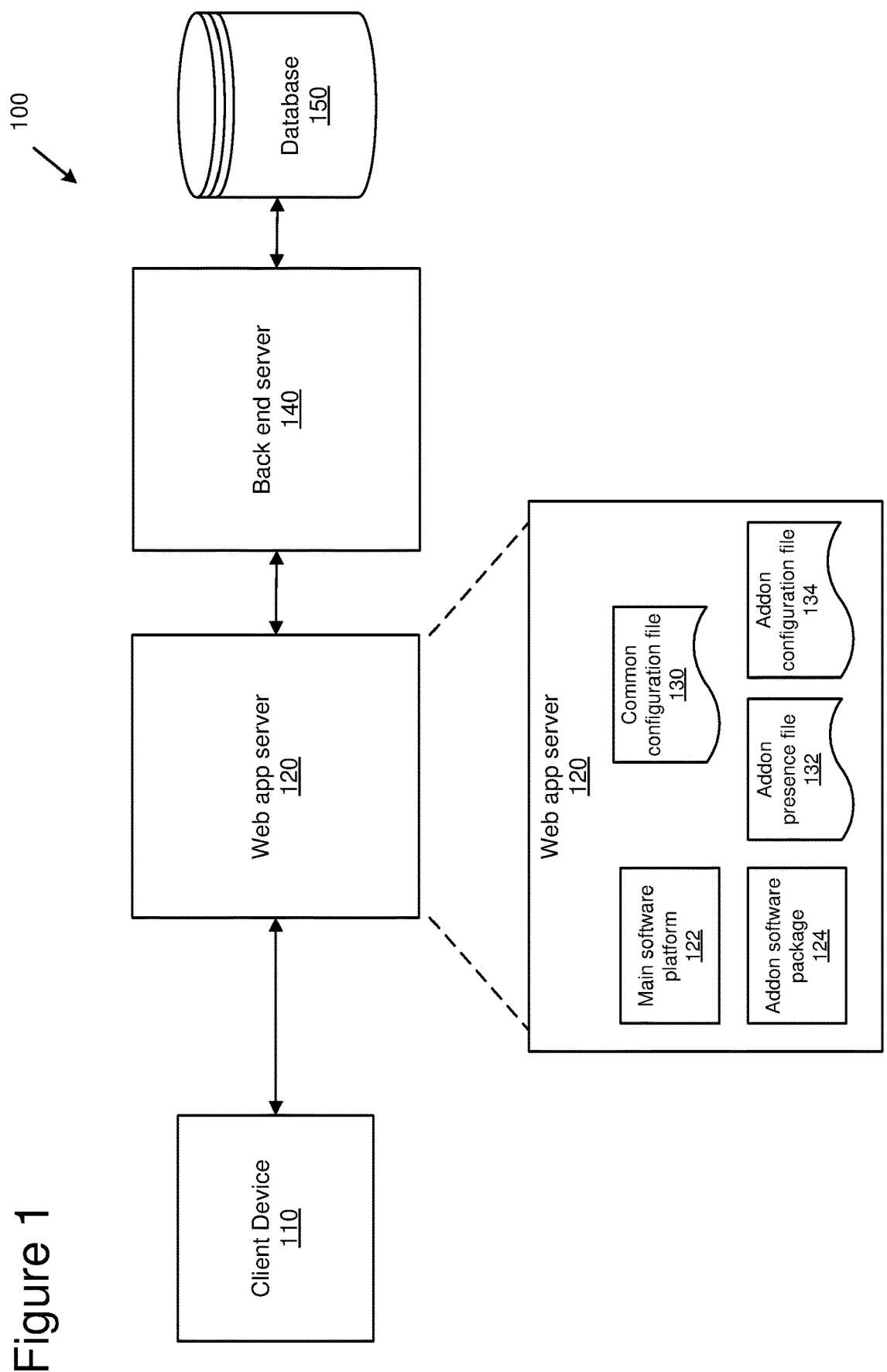
FIG. 1 is a diagram depicting an example environment for retaining configuration information for software applications during upgrades.

The following description is directed to technologies for retaining configuration information for software applications during upgrades. For example, when an addon software package is deployed to a web application server running a main software platform, the configuration information for the addon software package can be preserved separately (e.g., independent of the common configuration file) and used later to restore the addon configuration information if needed. In some implementations, an addon presence file is used to store an entry for the addon software package. The entry identifies another file containing the configuration information for the addon software package. If the main software platform is upgraded resulting in the common configuration file being overwritten or replaced, then the addon configuration information can be added back to the common configuration file using the preserved configuration information for the addon software package.

The technologies for retaining configuration information can be used for software such as web applications that run on a computer server. For example, a client device running a web browser can access software (e.g., a web application, which could be a mobile web application) running on a computer server via the web browser. The technologies can also be applied to other types of software applications that run on computing devices and that store configuration information in common configuration files used by other software applications or that otherwise have their configuration information overwritten during a software upgrade.

In typical solutions, a software platform is installed on a server. The software platform uses a common configuration file to store its configuration settings. The common configuration file may also be used by other software applications, such as addon applications that extend the functionality or otherwise work with the software platform. When an addon application is installed, it will also store at least a portion of its configuration settings in the same common configuration file used by the software platform. However, a problem can occur when the software platform is upgraded. Specifically, upgrading the software platform will overwrite the common configuration file. When this happens, the addon applications will no longer work (their configuration settings are no longer present in the common configuration file). For example, if the addon applications are mobile web applications, then clients will not be able to run the addon applications (e.g., they may receive an error message when trying to access the mobile web applications via a web browser). To resolve this situation, the configuration settings for the addon applications have to be manually added back to the common configuration file (e.g., by a system administrator), which may also have to be performed for each of multiple servers. This can be a time consuming and error prone process. It can also result in significant service disruption.

The technologies described herein provide advantages over such typical solutions. For example, configuration information for addon software packages can be retained in files that are separate from the common configuration file. When the main software platform is upgraded, these files can be automatically checked (e.g., as part of the upgrade process and/or by other automated computer processes) to determine if there are any addon software packages that are currently installed, and if so their configuration information can be added back to the common configuration file from the separate files. This automated process saves time, prevents errors (e.g., that may occur with a manual process), and reduces the chances of a service disruption (e.g., reduces the chance that an addon will not be available after the upgrade).

The following table, Table 1, depicts a number of example installation scenarios. The installation order column depicts the order of installing and/or upgrading a main software platform along with an addon software package. The second column indicates whether the installation order will result in a problem due to the common configuration file being replaced, or whether there will be no issues (either the common configuration has not been replaced or the addon configuration information has been added back to the common configuration file). When one of the problem installation scenarios occurs, the technologies described herein can be applied to automatically resolve the problem. For example, the row with "Platform+Addon+Platform" indicates that the main software platform has been installed, followed later by installation of an addon software package, followed later by an upgrade of the main software platform. This scenario will result in the common configuration file being overwritten. In this situation, the technologies described herein can be applied to restore the configuration information for the addon software package back to the common configuration file.

TABLE 1

Installation Order

| Installation order | |
|---|---|
| Platform + Addon | No issues |
| Platform + Addon + Platform | Problem |
| Platform + Addon + Addon | No issues |
| Platform + Addon + Platform + Addon | No issues |
| Platform + Addon + Platform + Platform | Problem |

The automated technologies described herein for retaining configuration information can fully automate the process of retaining configuration information for addon software packages during main software platform upgrades. For example, automated computer processes (e.g., retention services, content comparison services, and/or other software processes) can add entries to addon presence files, install addon configuration files, perform operations upon main software platform upgrade, check for entries in addon presence files, and add configuration information from addon configuration files to common configuration files. The automated technologies can be performed on each of a number of computing devices (e.g., for each server of a cluster).

Main Software Platform

In the technologies described herein, the main software platform can be any type of computer software package. For example, the main software platform can be a business intelligence platform, such as the BusinessObjects™ Business Intelligence platform provided by SAP®. In some implementations, the main software platform is installed on multiple computing devices (e.g., front-end components installed one or more web app servers and back-end components installed on one or more back-end servers). In some implementations, the main software platform comprises a mobile client application that is installed on a web app server. The mobile client application is accessed by a client device via a web browser.

The main software platform uses a common configuration file to store at least some of its configuration information (e.g., configuration values, configuration settings, default values, etc.). The common configuration file can be installed on the server when the main software platform is installed. When the main software platform is upgraded (e.g., when a new version of the main software platform is installed, when the main software platform is reinstalled, when components of the main software platform are upgraded, or when performing other upgrading procedures), the common configuration file is replaced. For example, the content of the common configuration file can be replaced, or the entire common configuration file can be overwritten. In other words, upgrading of the main software platform will overwrite the common configuration file, either replacing the content or installing a new common configuration file.

Addon Software Package

In the technologies described herein, the addon software package can any type of computer software package that operates with the main software platform. The addon software package can provide additional software features or functionality to the main software platform. For example, the addon software package can be a data visualization and analytics addon package that is an addon to a business intelligence platform. One example of an addon software package is the SAP Lumira® data visualization and analytics software addon for the BusinessObjects™ Business Intelligence platform provided by SAP®. In some implementations, the addon software package is installed on multiple computing devices (e.g., multiple web app servers). In some implementations, the addon software package provides an extension to a mobile client application and is accessed by client devices via a web browser.

The addon software package stores its configuration information in the common configuration file along with configuration information from other applications, such as the main software platform and/or other addon software packages. The addon software package also uses an addon presence file. For example, when the addon software package is installed, an entry is added to the addon presence file. The entry indicates that the addon software package is installed and also indicates the location of an addon configuration file. The addon configuration file (which can also be installed when the addon software package is installed) stores configuration information for the addon software package. The addon presence file and/or addon configuration file can also be created or modified when the addon software package is upgraded.

Common Configuration File

In the technologies described herein, the common configuration file stores configuration information (e.g., configuration values, configuration settings, default values, etc.) for various applications, including the main software platform and the addon software package. The common configuration file can be installed with the main software platform or at another time. The common configuration file is replaced (e.g., overwritten) when the main software platform is upgraded.

The common configuration file can be any type of file that is capable of storing configuration information within a computer system. For example, the common configuration file can be an extensible markup language (XML) file, a comma-separated value file, a spreadsheet file, a flat-file database file, or another type of file that stores configuration information.

Addon Presence File

In the technologies described herein, the addon presence file indicates which addon software packages are installed and the location of their respective configuration files. The addon presence file can be created when the main software platform is installed, when the first addon software package is installed, or at another time. The addon presence file can be any type of file that is capable of storing addon information within a computer system. For example, the addon presence file can be an extensible markup language (XML) file, a comma-separated value file, a spreadsheet file, a flat-file database file, or another type of file that stores information about addon software packages.

In some implementations, the addon presence file stores an entry for the addon software package that comprises an indication of a source file and an indication of a target file. The source file is the location (e.g., file name, path, etc.) of the addon configuration file for the addon software package. The target file is the location (e.g., file name, path, etc.) of the common configuration file where the configuration information will be copied to when the main software platform is updated.

The following is example content for an example XML addon presence file.

```
<addons>
    <addon name="com.sap.teamserver.mobile.addon">
        <files>
            <file source "$(WarfilesDir)/MobileBIService/WEB-INF/lumxMobileWeb.xml"
                target "$(WarfilesDir)/MobileBIService/WEB-INF/web.xml">
            </file>
        </files>
    </addon>
</addons>
```

In the example XML addon presence file, there is an entry (identified by the "addon name" element) for the Lumira addon software package. The entry also identifies a source file "lumxMobileWeb.xml," which is the addon configuration file for the Lumira addon software package, and a target file "web.xml," which is the common configuration file for the main software platform. Using this example XML addon presence file, configuration information can be added back to the web.xml file when the main software platform is updated. Specifically, in this example, when the main software platform is updated (replacing the web.xml file), the configuration information from the lumxMobileWeb.xml file can be added back to the web.xml file.

In some implementations, there is a single addon presence file that stores the presence information for any addons that are associated with a given main software platform. For example, if there are three different addon software packages for a given main software platform, then there could be three entries in the addon presence file (one per addon), where each entry indicates presence of its respective addon as well as where the respective addon's configuration file is located (e.g., the source and target identifiers). It is also possible for a given addon software package to have multiple addon configuration files (e.g., multiple source indicators) in the addon presence file.

Addon Configuration File

In the technologies described herein, the addon configuration file contains configuration information for the addon software package. The addon configuration file can be created when the addon software package is installed, or at another time. The addon configuration file can be any type of file that is capable of storing configuration information within a computer system. For example, the addon configuration file can be an extensible markup language (XML) file, a comma-separated value file, a spreadsheet file, a flat-file database file, or another type of file that stores configuration information for addon software packages.

The following is example content for an example addon configuration file that stores the configuration information in an XML format (i.e., an XML file).

```
<web-app>
    <servlet-mapping>
        <servlet-name>LumiraServlet</servlet-name>
        <url-pattern>/lumira</url-pattern>
    </servlet-mapping>
    <servlet-mapping>
        <servlet-name>LumxNativeServlet</servlet-name>
        <url-pattern>/lumx</url-pattern>
    </servlet-mapping>
    . . .
    <servlet>
        <servlet-name>LumiraServlet</servlet-name>
        <servlet-class>com.sap.teamserver.mobile.addon LumiraRequestDispatcher</servlet-class>
        <load-on-startup>1</load-on-startup>
    </servlet>
    <servlet>
        <servlet-name>LumxNativeServlet</servlet-name>
        <servlet-class>com.sap.teamserver.mobile.addon.LimoRequestHandler</servlet-class>
        <load-on-startup>1</load-on-startup>
    </servlet>
    . . .
</web-app>
```

In the example addon configuration file, there is configuration information for the Lumira addon software package (including the .lumx file format used by Lumira). The configuration information includes information about URLs and corresponding executable components of the Lumira addon software package that allows a client device to access the Lumira addon package (which is running on a web app server) using a web browser.

Environments for Retaining Configuration Information

Using the technologies described herein, environments can be provided for retaining configuration information for software applications running on servers (e.g., running on web application servers). The environments can comprise various types of computing resources (e.g., software resources, server computers, database systems, cloud computing resources, networking resources, and/or other types of computing resources).

FIG. 1 is a diagram depicting an example environment 100 for retaining configuration information for software applications during upgrades. The example environment 100 includes a client device 110. The client device 110 can be a phone, tablet, laptop computer, desktop computer, or another type of computing device. The client device 110 runs software that accesses the web app (application) server 120. For example, the client device 110 runs web browser software that accesses web applications (e.g., mobile web applications) provided by the web app server 120.

The example environment 100 also includes a back end server 140 and a database 150. For example, additional software resources (e.g., main platform software components) can run on the back end server 140 and provide support for the software (e.g., front end software components of the main platform software) running on the web app server 120. The database 150 can provide database resources to the software running on the back end server 140 and/or web app server 120.

As depicted in the example environment 100, a main software platform 122 is installed on the web app server 120. The main software platform 122 can be any type of computer software package. For example, the main software platform 122 can be a business intelligence platform. In some implementations, one or more components of the main software platform 122 are installed on the web app server 120 (e.g., front end software components) and one or more other components of the main software platform 122 are installed on the back end server 140 (e.g., back end software components).

An addon software package 124 is also installed on the web app server 120. The addon software package 124 is any type of computer software package that operates with the main software platform 122. The addon software package 124 can provide additional software features or functionality to the main software platform 122. For example, the addon software package 124 can be a data visualization and analytics addon package to a business intelligence platform.

The web app server 120 stores a number of files. One of the files is a common configuration file 130. The common configuration file 130 contains configuration settings for the main software platform 122 as well as any addon software packages that are associated with the main software platform 122, such as addon software package 124. In some implementations, the common configuration file 130 is installed along with the main software platform 122.

Another file is an addon presence file 132. The addon presence file 132 contains information indicating which addon software packages are installed along with details indicating how their respective configuration information can be restored (e.g., identifying addon configuration files). In some implementations, the addon presence file 132 is generated the first time an addon software package is installed on the web app server 120 (e.g., upon installing addon software package 124).

Another file is an addon configuration file 134. The addon configuration file 134 contains configuration information for the addon software package 124. In some implementations, the addon configuration file 134 is generated when the addon software package 124 is installed.

Using the software applications and files of the web app server 120, configuration information can be retained during software upgrades. In an example scenario, the main software platform 122 is installed on the web app server 120 along with the common configuration file 130. At this point, there are no addon software packages installed yet on the web app server 120. At a later time, the addon software package 124 is installed on the web app server 120 as an addon to the main software platform 122. Installation of the addon software package 124 involves adding configuration information for the addon software package 124 to the common configuration file 130. In addition, when the addon software package 124 is installed, the addon presence file 132 is created (if it does not already exist) and an entry is added to the addon presence file 132 indicating that the addon software package 124 has been installed. The entry in the addon presence file 132 also identifies the addon configuration file 134 as containing configuration information for the addon software package 124. The entry in the addon presence file 132 can also identify the common configuration file 130 (e.g., as the target file where the configuration information is to be restored).

After the addon software package 124 has been installed, the main software platform 122 may be upgraded (e.g., to a new version). When the main software platform 122 is upgraded, the common configuration file 130 is replaced (e.g., a new common configuration file could be installed or the contents of the common configuration file may be rewritten). The result is that the common configuration file 130, after the upgrade of the main software program 122, no longer contains the configuration information for the addon software package 124. To resolve this situation, the addon presence file 132 is checked (e.g., triggered by the upgrade of the main software platform 122) to see if there are any addon software package entries. Upon finding the entry for addon software package 124, the configuration information from the addon configuration file 134 is added to the common configuration file 130. In this way, the configuration information for the addon software package 124 is retained after the upgrade of the main software platform 122 is performed.

The example environment 100 depicts an example implementation of the web app server 120 and associated computing resources. However, the technologies described herein can be implemented in other computing environments. For example, there may be any number of client devices that connect to the web app server 120 to utilize the main software platform 122 and/or the addon software package 124 (e.g., as remote web applications accessible via web browsers). Similarly, there may be any number of web app servers. For example, there can be a plurality of web app servers (e.g., in a server cluster) where each web app server contains its own copy of the main software platform 122, the addon software package 124, the common configuration file 130, the addon presence file 132, and the addon configuration file 134. There may also be multiple back end servers and/or database resources. Furthermore, in some implementations there may be fewer servers. For example, some implementations may have just a single server that performs the functions of the web app server 120, and that could also perform functions of the back end server 140 and/or database 150.

Figure 2:
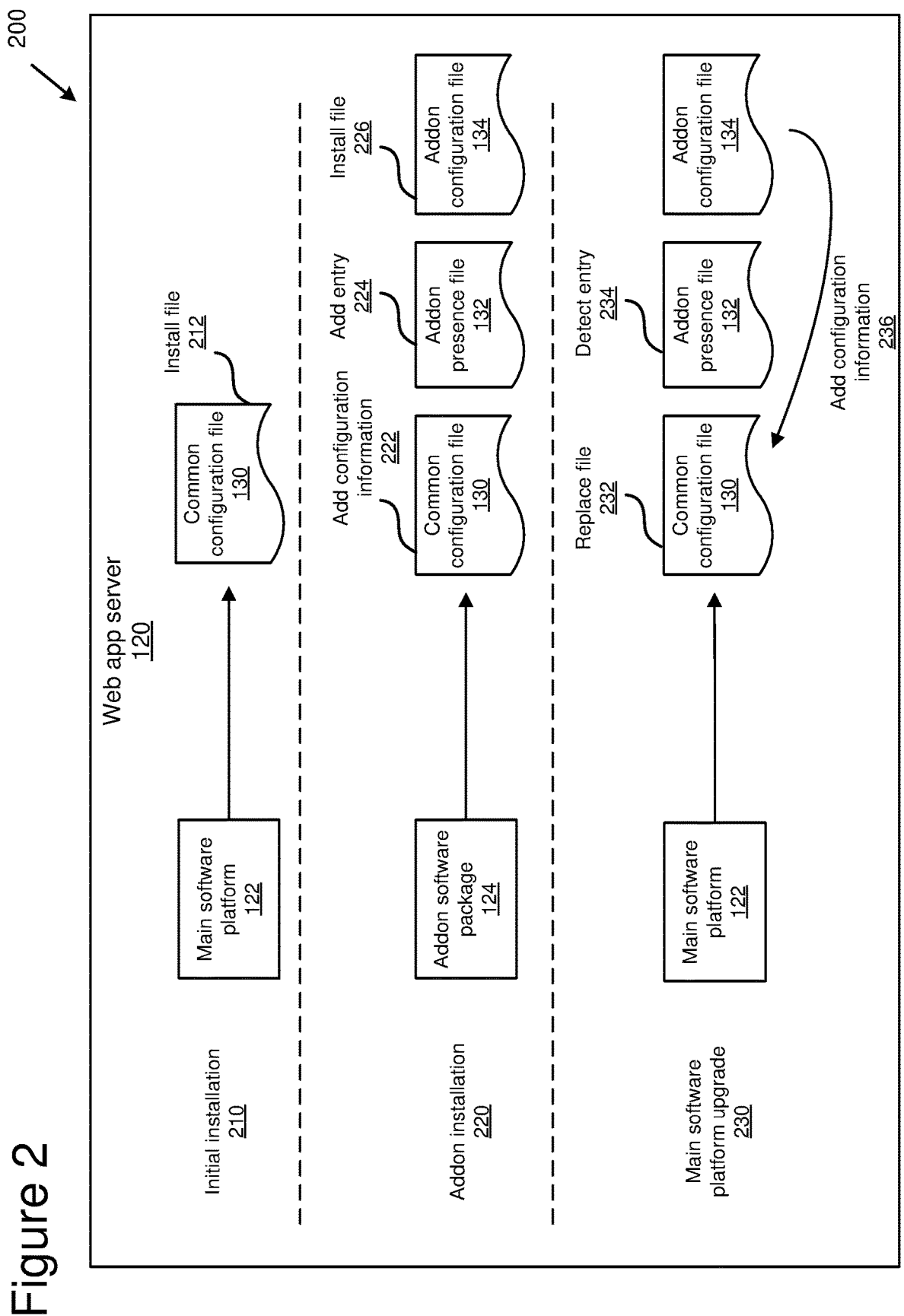
FIG. 2 is a diagram depicting an example web app server along with example scenarios during which configuration information is retained.

FIG. 2 is a diagram depicting an example web app server 120 along with example scenarios during which configuration information is retained. Specifically, this diagram depicts what happens during installation and upgrade of the various software programs and their associated files. At 210, an initial installation of the main software platform 122 is performed. As part of the installation, the common configuration file 130 is installed, as depicted at 212.

At 220, the addon software package 124 is installed. As part of the installation of the addon software package 124, the configuration information for the addon software package 124 is added to the common configuration file 130, ad depicted at 222. In addition, as part of the installation of the addon software package 124, an entry for addon software package 124 is added to the addon presence file 132, as depicted at 224. The addon presence file 132 may already exist (e.g., installed earlier as part of the initial installation 210) or it could be created at the time the addon software package 124 is installed. Also, as part of the installation of the addon software package 124, the addon configuration file 134 is installed, as depicted at 226. After the addon installation at 220, the addon software package 124 will be available for use by client devices (e.g., by client device 110 running a web browser).

At 230, the main software platform 122 is upgraded. As part of the upgrade process, the common configuration file 130 is replaced, as depicted at 232. After the common configuration file 130 is replaced, it no longer contains the configuration information for the addon software package 124. As part of the upgrade process, the addon presence file 132 is checked to see if it has any addon software package entries, as depicted at 234. Upon finding the entry for the addon software package 124 in the addon presence file 132, the configuration information for the addon software package 124 is added, from the addon configuration file 134, to the common configuration file 130, as depicted at 236. In some implementations, a separate software process (e.g., a retention service) is automatically executed by the upgrade process, checks the addon presence file 132 for any entries, and adds any configuration information for any addons back into the common configuration file 130.

In some situations, the addon software package 124 may be upgraded. When this occurs, the entry for the addon software package 124 in the addon presence file 132 can be checked and/or edited (e.g., by a separate software process, which can be called a content comparison service). For example, the upgraded addon software package 124 may include an additional addon configuration file (e.g., in addition to addon configuration file 134), and the entry for the addon software package 124 can be edited to include the additional addon configuration file. Upgrading the addon software package 124 can also result in editing of the addon configuration file 134 (e.g., with new and/or different configuration settings).

Methods for Retaining Configuration Information

In the technologies described herein, methods can be provided for retaining configuration information for software applications running on servers (e.g., running on web application servers). For example, hardware and/or software elements can perform operations to automatically add configuration information for currently installed addon software packages back into a common configuration file when a main software platform is upgraded.

Figure 3:
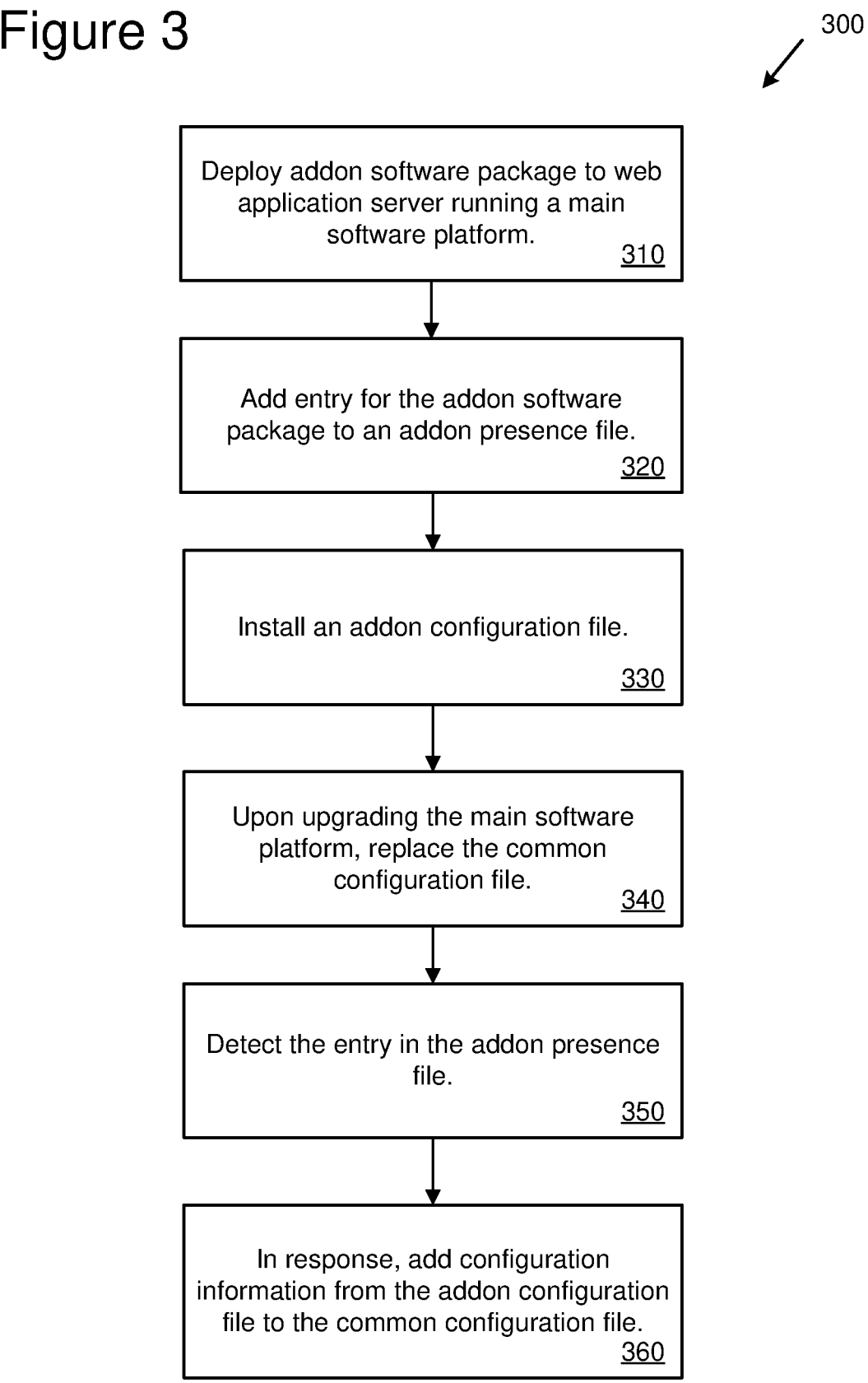
FIG. 3 is a flowchart of an example process for retaining configuration information when a main software platform is upgraded.

FIG. 3 is a flowchart depicting an example process 300 for retaining configuration information when a main software platform is upgraded. At 310, an addon software package is deployed to a web application server running a main software platform. The main software platform uses a common configuration file. During deployment, configuration information for the addon software package is added to the common configuration file.

At 320, an entry for the addon software package is added to an addon presence file. The entry indicates that the addon software package is installed. The entry can also indicate a source of configuration information for the addon software package (e.g., a separate file that stores the configuration information for use when the main software platform is upgraded). The entry can also indicate a target file (e.g., an indicator for the common configuration file) where the configuration information for the addon software package will be added after the main software platform is upgraded.

At 330, an addon configuration file is installed. The addon configuration file contains configuration information for the addon software package. The addon configuration file is separate from the common configuration file.

At 340, the main software platform is upgraded (e.g., a new major or minor version is installed). Upon upgrading the main software platform, a number of operations are performed. The operations include replacing the common configuration file. For example, the common configuration file can be overwritten when the main software platform is upgraded. When the common configuration file is replaced, the configuration information of the addon software package that was previously present in the common configuration file is no longer present. The operations also include, at 350, detecting the entry of the addon software package in the addon presence file. For example, source and target file identifiers can be obtained from the addon presence file. The operations also include, at 360, in response to detecting the entry in the addon presence file, adding configuration information from the addon configuration file to the common configuration file.

In some implementations, a retention service is executed as part of the upgrade process for the main software platform. The retention service (a software program) checks the addon presence file for addon software package entries (e.g., performs the operation depicted at 350), and if any entries are detected, the retention service adds configuration information from respective addon presence files back to the common configuration file (e.g., performs the operation depicted at 360). The retention service can be executed on each of a number of servers (e.g., on each server of a cluster) when the main software platform is upgraded on each server.

Figure 4:
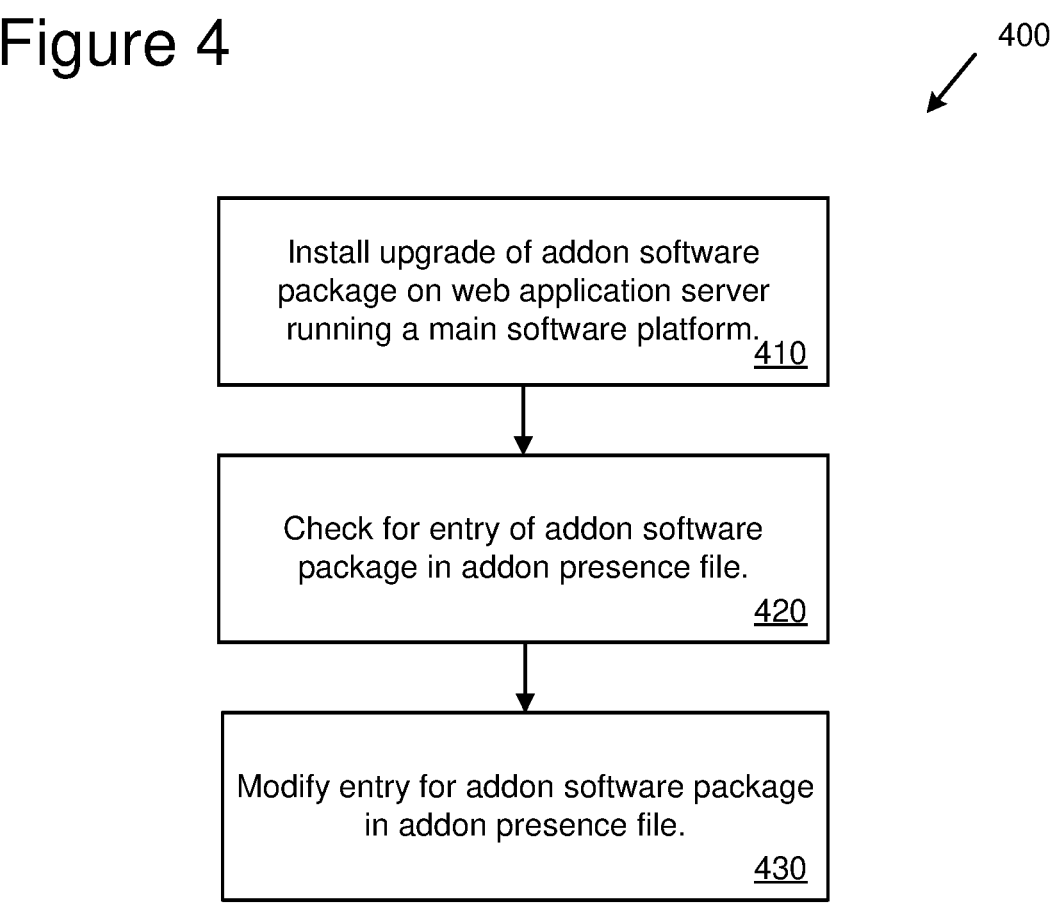
FIG. 4 is a flowchart of an example process for upgrading an addon software package, including modifying an addon presence file to support retention of configuration information.

FIG. 4 is a flowchart depicting an example process 400 for upgrading an addon software package. At 410, an upgraded addon software package is installed on a web application server running a main software platform. The main software platform and the addon software package use a common configuration file.

At 420, during the installation process for the upgraded addon software package, an addon presence file is checked to determine if there is an entry for the addon software package. If an entry is found, then at 430 the entry is modified. Modification of the entry for the addon software package in the addon presence file can include modifying the source and/or target file indicators, adding new source and/or target file indicators (e.g., the upgraded addon software package could add an additional configuration file), or making other changes. The installation process can also comprise adding files (e.g., adding a new configuration file for the addon software package), modifying files (e.g., modifying an existing configuration file for the addon software package), and/or performing other installation operations.

In some implementations, a content comparison service is executed as part of the upgrade process for the addon software package. The content comparison service (a software program) checks the addon presence file for an entry associated with the addon software package. If an entry is found, then the content comparison service updates the entry if needed (e.g., if the upgraded addon software package contains a new entry that is different from the existing entry). The content comparison service can be executed on each of a number of servers (e.g., on each server of a cluster) when an addon software package is upgraded on each server.

Computing Systems

Figure 5:
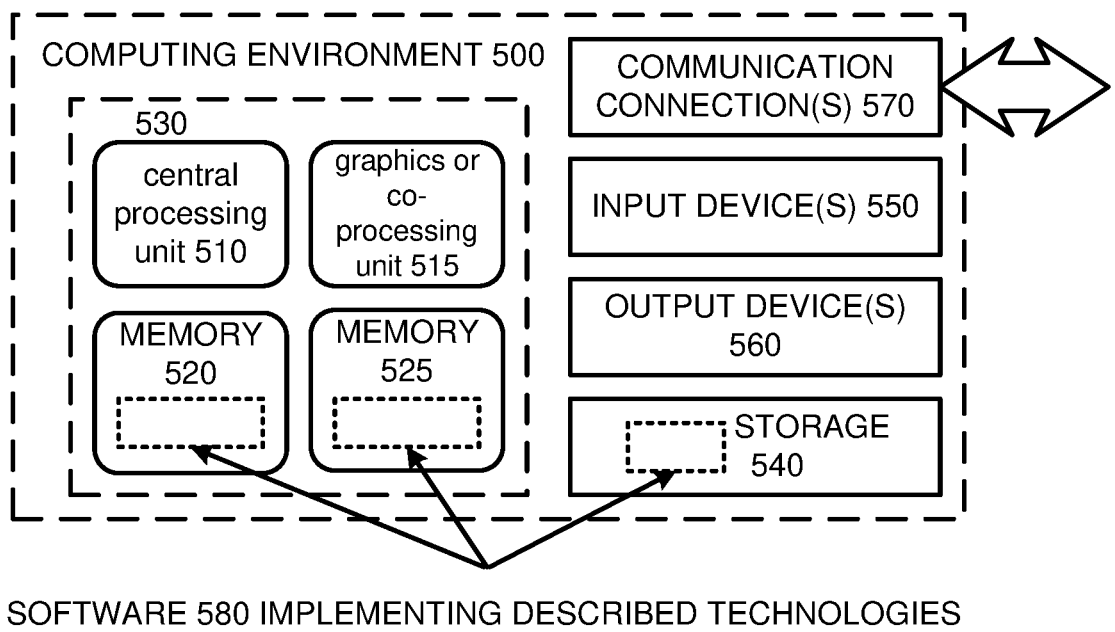
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 6:
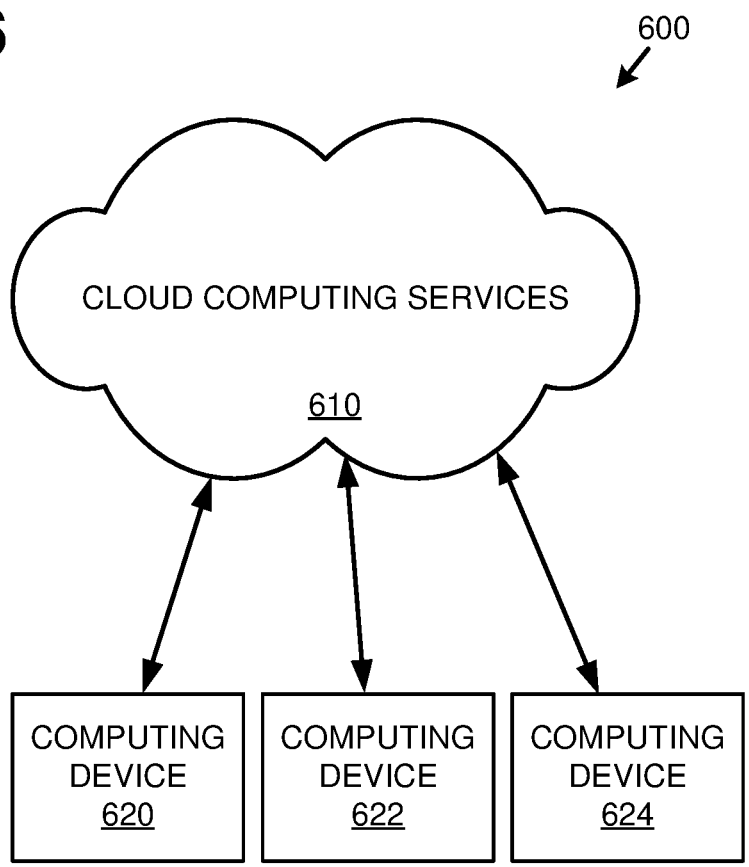
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, database resources, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for automated retention of configuration information, the method comprising:
deploying an addon software package to a web application server, wherein the web application server is running a main software platform, wherein the main software platform uses a common configuration file; and wherein the addon software package adds configuration information to the common configuration file;
adding an entry for the addon software package to an addon presence file;
installing an addon configuration file that contains configuration information for the addon software package;
upon upgrading the main software platform:
replacing the common configuration file;
detecting the entry for the addon software package from the addon presence file; and
responsive to detecting the entry for the addon software package, adding configuration information from the addon configuration file to the common configuration file.

2. The method of claim 1, wherein the common configuration file stores configuration information for the main software platform, the addon software package, and any additional addon software packages.

3. The method of claim 1, wherein adding the entry for the addon software package to the addon presence file comprises:
adding a source file indicator that indicates a location of the addon configuration file; and
adding a target file indicator that indicates a location of the common configuration file.

4. The method of claim 1, further comprising:
upon upgrading the main software platform, automatically executing an addon retention service that detects the entry for the addon software package and adds the configuration information from the addon configuration file to the common configuration file.

5. The method of claim 1, wherein the method is repeated for each of a plurality of web application servers.

6. The method of claim 1, further comprising:
performing the method for one or more additional addon software packages, wherein each of the one or more additional addon software packages has its respective entry in the addon presence file, and its respective addon configuration file.

7. The method of claim 1, further comprising:
adding one or more additional addon configuration files for the addon software package to the addon presence file;
upon upgrading the main software platform:
detecting the one or more additional addon configuration files for the addon software package in the addon presence file; and
responsive to detecting the one or more additional addon configuration files for the addon software package, adding configuration information from the one or more additional addon configuration files to the common configuration file.

8. The method of claim 1, wherein adding the entry for the addon software package to the addon presence file is performed in response to determining that the addon presence file did not contain the entry for the addon software package.

9. The method of claim 1, wherein the configuration information for the addon software package comprises uniform resource locator (URL) mapping information to an executable of the addon software package.

10. The method of claim 1, further comprising:
receiving, over a network connection, a request form a client device to access the addon software package; and
responsive to receiving the request, executing the addon software package using the configuration information from the common configuration file.

11. The method of claim 1, wherein the web application server provides web applications for one or more client devices.

12. A computing device comprising:
a processor; and
memory;
the computing device configured, via computer-executable instructions, to perform operations for automated retention of configuration information, the operations comprising:
deploying an addon software package on the computing device, wherein the computing device is running a main software platform, wherein the main software platform uses a common configuration file; and wherein the addon software package adds configuration information to the common configuration file;
adding an entry for the addon software package to an addon presence file;
installing an addon configuration file that contains configuration information for the addon software package;
upon upgrading the main software platform:
replacing the common configuration file;
detecting the entry for the addon software package from the addon presence file; and
responsive to detecting the entry for the addon software package, adding configuration information from the addon configuration file to the common configuration file.

13. The computing device of claim 12, wherein the common configuration file stores configuration information for the main software platform, the addon software package, and any additional addon software packages.

14. The computing device of claim 12, wherein adding the entry for the addon software package to the addon presence file comprises:
adding a source file indicator that indicates a location of the addon configuration file; and
adding a target file indicator that indicates a location of the common configuration file.

15. The computing device of claim 12, the operations further comprising:
upon upgrading the main software platform, automatically executing an addon retention service that detects the entry for the addon software package and adds the configuration information from the addon configuration file to the common configuration file.

16. The computing device of claim 12, wherein the configuration information for the addon software package comprises uniform resource locator (URL) mapping information to an executable of the addon software package.

17. One or more computer-readable storage media storing computer-executable instructions for execution on one or more computing devices to perform operations for automated retention of configuration information, the operations comprising:
deploying an addon software package to a web application server, wherein the web application server is running a main software platform, wherein the main software platform uses a common configuration file; and wherein the addon software package adds configuration information to the common configuration file;
adding an entry for the addon software package to an addon presence file;
installing an addon configuration file that contains configuration information for the addon software package;
upon upgrading the main software platform:
replacing the common configuration file;
detecting the entry for the addon software package from the addon presence file; and
responsive to detecting the entry for the addon software package, adding configuration information from the addon configuration file to the common configuration file.

18. The one or more computer-readable storage media of claim 17, wherein the common configuration file stores configuration information for the main software platform, the addon software package, and any additional addon software packages.

19. The one or more computer-readable storage media of claim 17, wherein adding the entry for the addon software package to the addon presence file comprises:
adding a source file indicator that indicates a location of the addon configuration file; and
adding a target file indicator that indicates a location of the common configuration file.

20. The one or more computer-readable storage media of claim 17, the operations further comprising:
upon upgrading the main software platform, automatically executing an addon retention service that detects the entry for the addon software package and adds the configuration information from the addon configuration file to the common configuration file.

* * * * *